United States Patent
Jeong (10) Patent No.: US 12,322,838 B2
(45) Date of Patent: Jun. 3, 2025

(54) SEPARATOR FOR FUEL CELL

(71) Applicants: Hyundai Motor Company, Seoul (KR); Kia Motors Corporation, Seoul (KR)

(72) Inventor: Hee Seok Jeong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 567 days.

(21) Appl. No.: 16/886,947

(22) Filed: May 29, 2020

(65) Prior Publication Data

US 2021/0184230 A1   Jun. 17, 2021

(30) Foreign Application Priority Data

Dec. 16, 2019   (KR) .......................... 10-2019-0167580

(51) Int. Cl.
 *H01M 8/0258* (2016.01)
 *H01M 8/1004* (2016.01)
 *H01M 8/2483* (2016.01)

(52) U.S. Cl.
 CPC ....... *H01M 8/0258* (2013.01); *H01M 8/1004* (2013.01); *H01M 8/2483* (2016.02)

(58) Field of Classification Search
 CPC ................ H01M 8/0202–0267; H01M 8/0258
 See application file for complete search history.

(56) References Cited

U.S. PATENT DOCUMENTS

| | | | |
|---|---|---|---|
| 8,114,549 B2 | 2/2012 | Numata | |
| 8,338,035 B2 * | 12/2012 | Chin | H01M 8/0206 429/246 |
| 9,306,226 B2 | 4/2016 | Jang et al. | |
| 9,853,299 B2 | 12/2017 | Jeong | |
| 10,320,008 B2 | 6/2019 | Jin et al. | |
| 10,566,645 B2 * | 2/2020 | Watanabe | H01M 8/0258 |
| 10,727,503 B2 | 7/2020 | Ko et al. | |
| 2006/0003220 A1 * | 1/2006 | Sugiura | H01M 8/0273 429/514 |
| 2009/0325020 A1 | 12/2009 | Numata | |
| 2012/0070760 A1 | 3/2012 | Ko et al. | |
| 2013/0149633 A1 | 6/2013 | Jeong | |
| 2013/0302723 A1 | 11/2013 | Ko et al. | |
| 2014/0178785 A1 | 6/2014 | Jang et al. | |
| 2016/0093901 A1 | 3/2016 | Yoshizumi et al. | |
| 2016/0181631 A1 | 6/2016 | Jang et al. | |
| 2016/0344044 A1 | 11/2016 | Jin et al. | |
| 2017/0005346 A1 * | 1/2017 | Lim | H01M 8/0273 |
| 2017/0179510 A1 | 6/2017 | Matsusue et al. | |
| 2018/0108916 A1 | 4/2018 | Loretz et al. | |
| 2018/0166705 A1 | 6/2018 | Ko et al. | |
| 2023/0187658 A1 * | 6/2023 | Matian | H01M 8/0258 429/514 |

FOREIGN PATENT DOCUMENTS

| | | | | |
|---|---|---|---|---|
| CN | 102437347 A | | 5/2012 | |
| CN | 106169591 A | | 11/2016 | |
| JP | 2010040169 A | * | 2/2010 | .......... H01M 8/0228 |
| JP | 2010153279 A | | 7/2010 | |
| JP | 5352228 B2 | * | 11/2013 | |
| KR | 101361298 B1 | | 2/2014 | |
| KR | 101449193 B1 | | 10/2014 | |
| KR | 20180068657 A | | 6/2018 | |
| KR | 20190036850 A | | 4/2019 | |
| WO | 2008032168 A2 | | 3/2008 | |

OTHER PUBLICATIONS

Machine Translation of JP5352228B2 (Year: 2013).*
Hou, Ming, et al., "A New Structure of Static Water Removal for Proton Exchange Membrane Fuel Cell," Chinese Journal of Power Sources, vol. 26, No. 3, Jun. 2002, 3 pages.
The National Intellectual Property Administration, PRC, Notification of the First Office Action issued in Application No. 202010583707. 5, Sep. 15, 2023, 19 pages.

* cited by examiner

*Primary Examiner* — Muhammad S Siddiquee
(74) *Attorney, Agent, or Firm* — SLATER MATSIL, LLP (57) ABSTRACT

A separator for a fuel cell includes a main body having an inlet manifold for inflow of a reactant gas, an outlet manifold for outflow of the reactant gas, and a flow area between the inlet manifold and the outlet manifold where the reactant gas is configured to flow, and a resistance part provided in the flow area of the main body adjacent to the inlet manifold of the main body, the resistance part being configured to increase flow resistance to the reactant gas introduced from the inlet manifold and flowing toward the outlet manifold.

20 Claims, 6 Drawing Sheets

SEPARATOR FOR FUEL CELL

CROSS-REFERENCE TO RELATED APPLICATIONS

This application claims priority to Korean Patent Application No. 10-2019-0167580, filed in the Korean Intellectual Property Office on Dec. 16, 2019, which application is hereby incorporated herein by reference.

TECHNICAL FIELD

The present disclosure relates to a separator for a fuel cell.

BACKGROUND

In a polymer electrolyte membrane fuel cell (PEMFC), air and fuel (hydrogen) are supplied to a cathode and an anode of a fuel cell stack as reactant gases. The air or the fuel is supplied to the cathode or the anode after being humidified in a humidifier. Water is produced in a fuel cell reaction. In consideration of this, the degree of humidification by the humidifier is determined. When the air and the fuel flow in opposite directions, the fuel cell reaction occurs more at downstream sides of the reactant gases than at upstream sides thereof. Therefore, at the upstream sides of the reactant gases, an electrolyte membrane is likely to be degraded due to low moisture content of the electrolyte membrane. Because the air is mainly humidified, the aforementioned problem mainly arises at the upstream side of the air flow. To solve this problem, changing the structure of a separator may be considered. However, the difficulty level of development or manufacture may be raised.

SUMMARY

Embodiments of the present disclosure have been made to solve problems occurring in the prior art while advantages achieved by the prior art are maintained intact.

An embodiment of the present disclosure provides a separator for a fuel cell that is capable of solving a problem of degradation in an electrolyte membrane that mainly occurs at upstream sides of reactant gases, in spite of the use of an existing separator without change.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a separator for a fuel cell includes a main body having an inlet manifold for inflow of a reactant gas, an outlet manifold for outflow of the reactant gas, and a flow area where the reactant gas flows between the inlet manifold and the outlet manifold, and a resistance part that is provided in the flow area of the main body so as to be adjacent to the inlet manifold of the main body and that increases flow resistance to the reactant gas introduced from the inlet manifold and flowing toward the outlet manifold.

In an embodiment, the flow area may include a reaction area having a reactant gas guide channel disposed therein, in which the reactant gas guide channel guides the reactant gas to electrodes of a membrane electrode assembly, and a diffusion area located between the reaction area and the inlet manifold and having a diffusion channel disposed therein, in which the diffusion channel diffuses, toward the reaction area, the reactant gas introduced from the inlet manifold. The resistance part may be disposed in the diffusion channel in the diffusion area.

In an embodiment, the resistance part may include a diffusion-area porous body that lowers flow speed of the reactant gas passing through the diffusion channel.

In an embodiment, the diffusion-area porous body may be formed to be more hydrophilic than a reaction-area porous body that is disposed in the reaction area and that forms the reactant gas guide channel.

In an embodiment, the diffusion-area porous body may be integrated with a reaction-area porous body that is disposed in the reaction area and that forms the reactant gas guide channel.

In an embodiment, the inlet manifold may include a first inlet manifold for inflow of air and a second inlet manifold for inflow of hydrogen, and the outlet manifold may include a first outlet manifold for outflow of the air and a second outlet manifold for outflow of the hydrogen. The first and second inlet manifolds and the first and second outlet manifolds may be disposed such that the air and the hydrogen flow in opposite directions and a line drawn from the first inlet manifold to the first outlet manifold crosses a line drawn from the second inlet manifold to the second outlet manifold. The flow area may include a first reaction area having a first reactant gas guide channel disposed therein, in which the first reactant gas guide channel guides the air to a cathode of a membrane electrode assembly, and a first diffusion area located between the first reaction area and the first inlet manifold and having a first diffusion channel disposed therein, in which the first diffusion channel diffuses, toward the first reaction area, the air introduced from the first inlet manifold. The resistance part may be disposed in the first diffusion channel in the first diffusion area.

In an embodiment, the resistance part may include an upper portion disposed in an area of the first diffusion channel that is adjacent to the first inlet manifold, and a lower portion disposed in an area of the first diffusion channel that is adjacent to the second outlet manifold. The upper portion of the resistance part may be formed to be more hydrophilic than the lower portion of the resistance part.

In an embodiment, the inlet manifold may be configured to introduce air as the reactant gas, and the outlet manifold may be configured to release the air.

According to another embodiment of the present disclosure, a separator for a fuel cell includes a main body having an inlet manifold for inflow of a reactant gas, an outlet manifold for outflow of the reactant gas, and a flow area where the reactant gas flows between the inlet manifold and the outlet manifold, and a resistance part that is provided in the flow area of the main body so as to be adjacent to the inlet manifold of the main body and that allows moisture in the reactant gas introduced from the inlet manifold and flowing toward the outlet manifold to stagnate.

In an embodiment, the flow area may include a reaction area in which a reaction-area porous body that forms a reactant gas guide channel that guides the reactant gas to electrodes of a membrane electrode assembly is disposed. The reaction-area porous body may include an upstream portion that is disposed adjacent to the inlet manifold and into which the reactant gas flows, and a downstream portion disposed downstream of the upstream portion. The upstream portion of the reaction-area porous body may be formed to be more hydrophilic than the downstream portion of the reaction-area porous body.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

Figure 1:
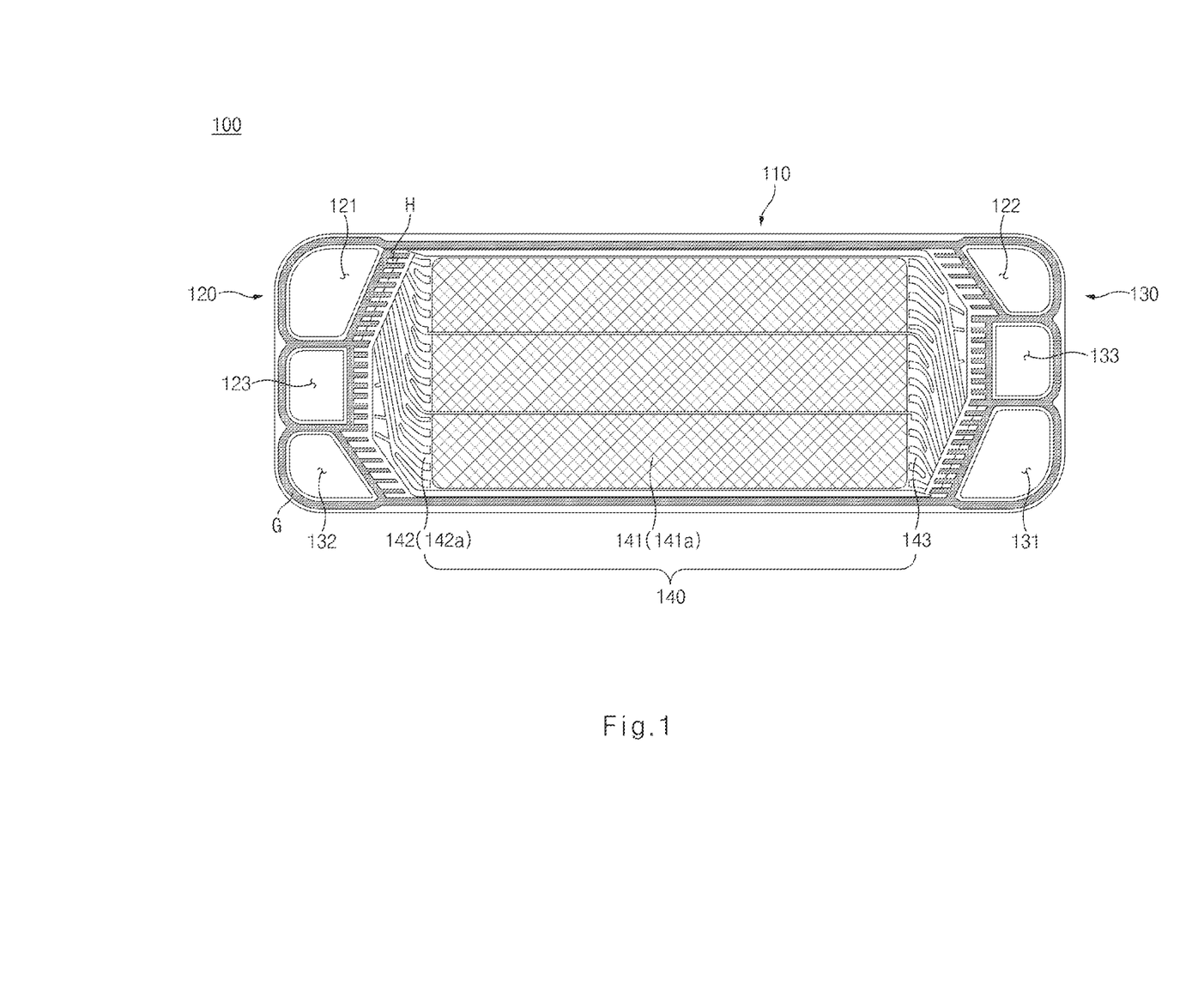
FIG. 1 is a plan view illustrating a separator to which an embodiment of the present disclosure is applied.

The present disclosure relates to a separator for a fuel cell and may be applied to a separator 100 (refer to FIG. 1) that will be described below. FIG. 1 is a plan view illustrating the separator 100 to which an embodiment of the present disclosure is applied.

The separator 100 illustrated in FIG. 1 may include a main body 110. The main body no may be formed by stacking a plurality of flat plates.

The main body no may have an inlet manifold 120 and an outlet manifold 130. The inlet manifold 120 may include a first inlet manifold 121 for inflow of air and a second inlet manifold 122 for inflow of hydrogen (fuel). The outlet manifold 130 may include a first outlet manifold 131 for outflow of the air and a second outlet manifold 132 for outflow of the hydrogen.

The first and second inlet manifolds 121 and 122 and the first and second outlet manifolds 131 and 132 may be disposed such that the air and the hydrogen flow in opposite directions. For example, as illustrated in FIG. 1, the first inlet manifold 121 may be formed at a left distal end of the main body 110, and the first outlet manifold 131 may be formed at a right distal end of the main body 110. The second inlet manifold 122 may be formed at the right distal end of the main body 110, and the second outlet manifold 132 may be formed at the left distal end of the main body 110.

The first and second inlet manifolds 121 and 122 and the first and second outlet manifolds 131 and 132 may be disposed such that a line drawn from the first inlet manifold 121 to the first outlet manifold 131 crosses a line drawn from the second inlet manifold 122 to the second outlet manifold 132. For example, as illustrated in FIG. 1, the first inlet manifold 121 may be formed at an upper left end of the main body 110, and the first outlet manifold 131 may be formed at a lower right end of the main body 110. The second inlet manifold 122 may be formed at an upper right end of the main body 110, and the second outlet manifold 132 may be formed at a lower left end of the main body 110.

As illustrated in FIG. 1, the inlet manifold 120 may further include a third inlet manifold 123 for inflow of cooling water. The outlet manifold 130 may further include a third outlet manifold 133 for outflow of the cooling water.

The manifolds may be separated from one another by a gasket G.

The main body 110 may additionally have a flow area 140. The flow area 140 is an area where the reactant gases flow between the inlet manifold 120 and the outlet manifold 130. The separator 100 of a fuel cell stack may form flow passages through which the reactant gases flow. The flow area 140 may be at least part of a flow-passage forming the face of the main body 110.

Figure 2:
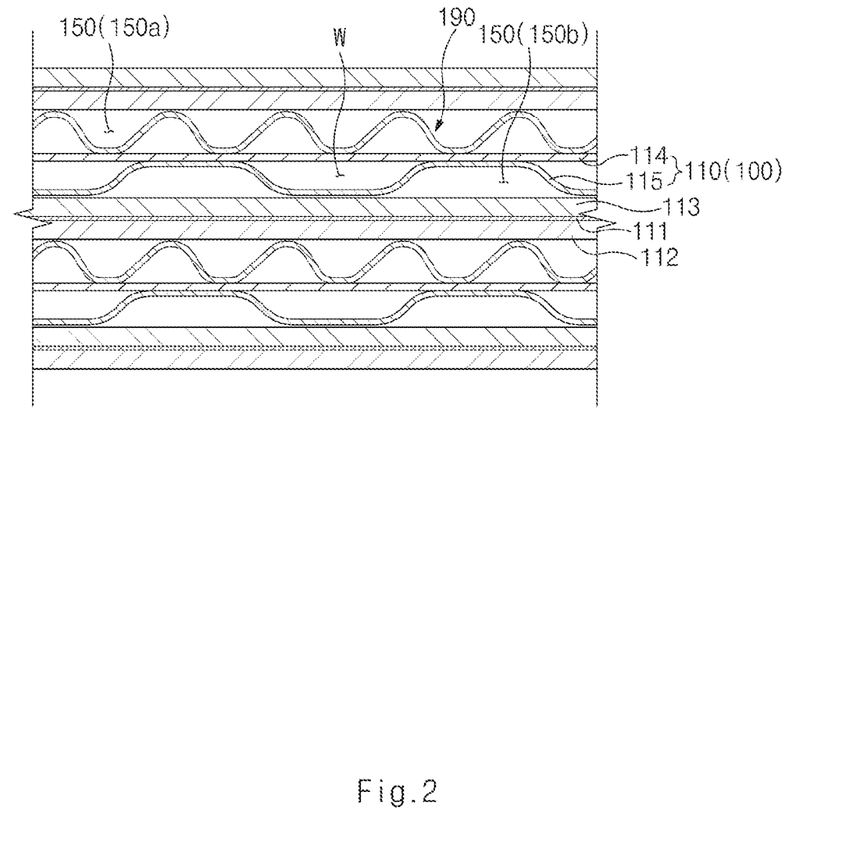
FIG. 2 is a sectional view illustrating part of a fuel cell stack including the separator of FIG. 1.

As illustrated in FIG. 2, the main body 110 of the separator 100 may be formed by stacking a cathode separator 114 and an anode separator 115. FIG. 2 is a sectional view illustrating part of the fuel cell stack including the separator of FIG. 1. An air guide channel 150a for a flow of the air may be provided between the cathode separator 114 and a membrane electrode assembly (MEA) in opposite thereto. A fuel guide channel 150b for a flow of the fuel may be formed between the anode separator 115 and an MEA 111 opposite thereto. As described above, the channels 150a and 150b for the flow of the reactant gases may be provided on one surface and an opposite surface of the main body 110. The portion of the main body 110 in which the channels 150a and 150b are provided may be the flow area 140 of FIG. 1. "W" in FIG. 2 denotes a cooling water guide channel.

Each of the MEAs 111 may include an electrolyte membrane, and a cathode and an anode formed on opposite surfaces of the electrolyte membrane. Gas diffusion layers (GDLs) may be disposed on the opposite surfaces of the MEA 111. In FIG. 2, reference numeral 112 denotes a cathode gas diffusion layer, and reference numeral 113 denotes an anode gas diffusion layer.

As illustrated in FIG. 1, the flow area 140 may include a reaction area 141. The reaction area 141 is an area where reactant gas guide channels 150 (refer to FIG. 2) that guide the reactant gases to the electrodes of the MEA 111 are disposed. The reactant gas guide channels 150 may include the first reactant gas guide channel 150a for guiding the air to the cathode of the MEA 111 and the second reactant gas guide channel 150b for guiding the fuel to the anode of the MEA 111. The first reactant gas guide channel 150a corresponds to the air guide channel described above, and the second reactant gas guide channel 150b corresponds to the fuel guide channel described above. The reaction area 141 may include a first reaction area 141a where the first reactant gas guide channel 150a is disposed and a second reaction area (not illustrated) where the second reactant gas guide channel 150b is disposed. The second reaction area may be provided on a rear surface of the main body 110 of FIG. 1.

Figure 3:
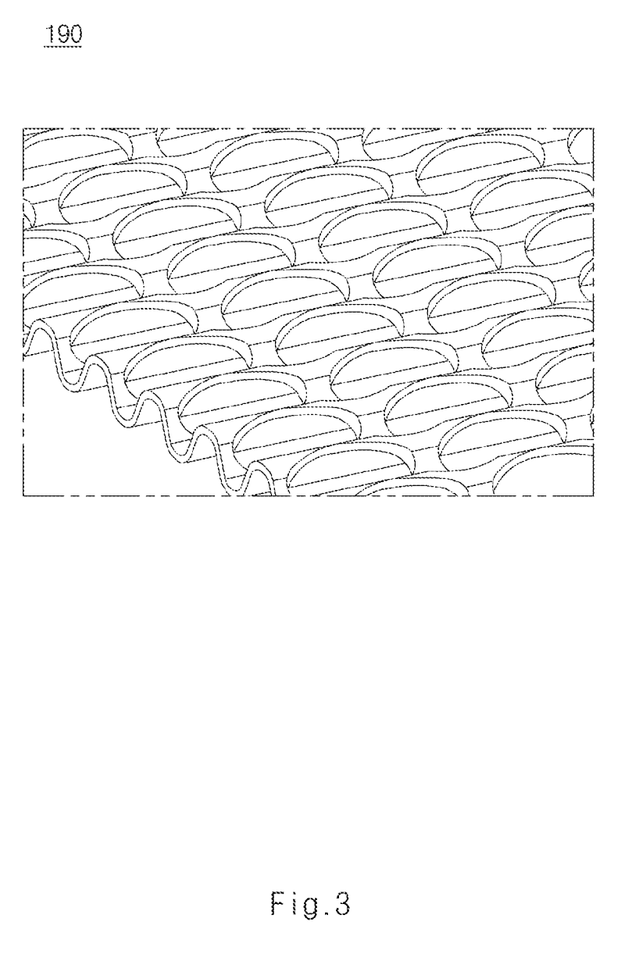
FIG. 3 is a perspective view illustrating a porous structure disposed in a reaction area of the separator of FIG. 1.

A reaction-area porous body 190 illustrated in FIGS. 2 and 3 may be disposed in the reaction area 141. In FIG. 2, a porous structure disposed between the cathode separator 114 and the MEA 111 opposite thereto is illustrated as the reaction-area porous body 190. The reaction-area porous body 190, together with the cathode separator 114, may form the air guide channel. Due to the reaction-area porous body 190, the air may be more smoothly guided to the cathode in the air guide channel. For reference, in the reaction area 141, a general reactant gas flow passage formed by the separators may be provided instead of the reaction-area porous body 190.

As illustrated in FIG. 1, the flow area 140 may further include a diffusion area 142. The diffusion area 142 is located between the reaction area 141 and the inlet manifold 120. A diffusion channel 160 for diffusing, toward the reaction area 141, the reactant gases introduced from the inlet manifold 120 is disposed in the diffusion area 142. The reactant gases in the inlet manifold 120 may be moved to the diffusion channel 160 through holes H and thereafter diffused into the reaction area 141 through the diffusion channel 160. The diffusion channel 160 (refer to FIG. 5) may be formed between lands 161.

The diffusion area 142 may include a first diffusion area 142*a* located between the first reaction area 141*a* and the first inlet manifold 121. The first diffusion area 142*a* is an area where a first diffusion channel 160*a* (refer to FIG. 4) that diffuses, toward the first reaction area 141*a*, the air introduced from the first inlet manifold 121 is disposed.

As illustrated in FIG. 1, the flow area 140 may further include a recovery area 143. The recovery area 143 is located between the reaction area 141 and the outlet manifold 130. The recovery area 143 is an area where a recovery channel (not illustrated) that guides the reactant gases in the reaction area 141 to the outlet manifold 130 is disposed. The recovery channel may have substantially the same structure as the diffusion channel 160.

Embodiment 1

A separator according to embodiment 1 of the present disclosure may include a main body 110 and a resistance part 180. The main body 110 of this embodiment may be the main body 110 described above.

The resistance part 180 (refer to FIG. 4) of this embodiment is configured to increase flow resistance to a reactant gas that is introduced from the inlet manifold 120 and that flows toward the outlet manifold 130. The flow resistance refers to a force against the flow of the fluid. The flow resistance is mainly determined by the diameter and length of a pipe through which the fluid flows, the viscosity of the fluid, and the like. The resistance part 180 of this embodiment may increase the flow resistance in such a manner as to decrease the diameter of the pipe.

For example, the resistance part 180 of this embodiment may increase the flow resistance in such a manner as to block part of a channel through which the reactant gas flows. More specifically, the resistance part 180 of this embodiment may include a porous body. The flow resistance to the reactant gas may be increased by filling the channel for the flow of the reactant gas with the porous body. The porous body of this embodiment may be any one of porous materials. For example, the porous body may be metal foam. Alternatively, the porous body may be formed in a shape similar to a gas diffusion layer (GDL) that is formed by agglomeration of graphite fiber.

The reactant gas may flow slower as the flow resistance is increased. The degree to which moisture remains in the reactant gas may be raised when the velocity of the reactant gas is lowered. Due to the increase in the flow resistance by the resistance part 180, the separator of this embodiment may allow the moisture in the reactant gas to further remain in the area where the resistance part 180 is disposed, and may allow the remaining moisture to be left for a longer period of time in the area where the resistance part 180 is disposed.

The separator of this embodiment may improve a problem of degradation in an electrolyte membrane by disposing the resistance part 180 in a place where the electrolyte membrane is likely to be degraded. Furthermore, even in a downstream area of the resistance part 180 that is disposed adjacent to the area where the resistance part 180 is disposed, the separator of this embodiment may improve a problem of degradation in an electrolyte membrane due to an increase in moisture in the area where the resistance part 180 is disposed.

The resistance part 180 of this embodiment may be disposed in the flow area 140 (refer to FIG. 2) of the main body 110 and may be disposed adjacent to the inlet manifold 120 of the main body 110. A region of the flow area 140 that is located adjacent to the inlet manifold 120 is a region where a moisture content of an electrolyte membrane located to correspond to the relevant region is likely to be lowered. Accordingly, the resistance part 180 of this embodiment may be disposed adjacent to the inlet manifold 120 to raise the moisture content of the electrolyte membrane in the region located adjacent to the inlet manifold 120.

Figure 4:
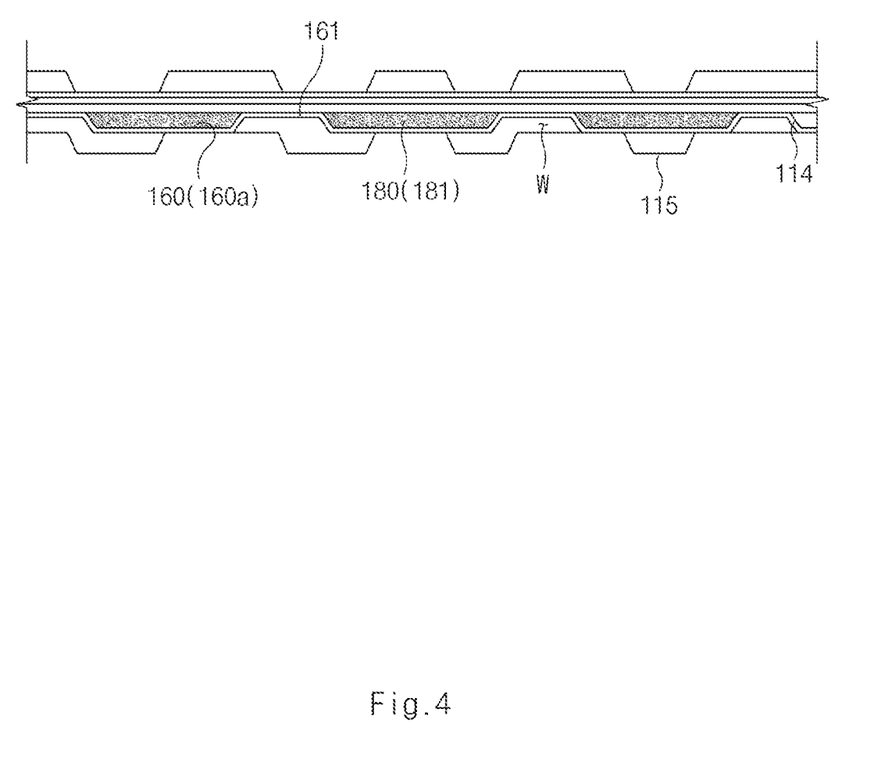
FIG. 4 is a sectional view illustrating part of a diffusion area of the fuel cell stack including the separator of FIG. 1.
Figure 5:
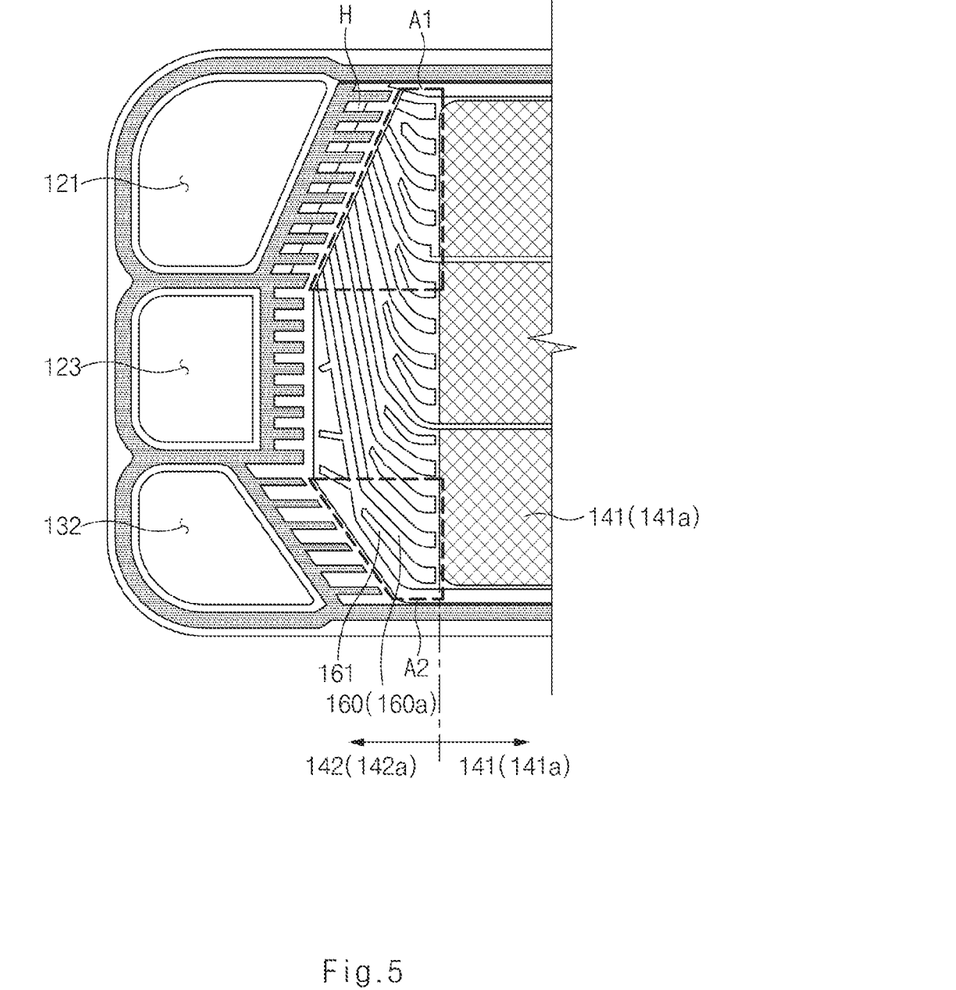
FIG. 5 is an enlarged plan view illustrating part of the separator of FIG. 1.

As illustrated in FIG. 4, the resistance part 180 of this embodiment may be disposed in the diffusion channel 160 in the diffusion area 142 (refer to FIG. 5). FIG. 4 is a sectional view illustrating part of the diffusion area of the fuel cell stack including the separator of FIG. 1. The diffusion channel 160 for diffusing, toward the reaction area 141, the reactant gas introduced from the inlet manifold 120 is disposed between the lands 161 in the diffusion area 142 (refer to FIG. 5). The resistance part 180 of this embodiment may be disposed in the diffusion channel 160 (refer to FIG. 4).

The moisture content of the electrolyte membrane may be mainly lowered in an area located adjacent to the first inlet manifold 121 for inflow of air. Accordingly, the resistance part 180 of this embodiment may be provided in the first diffusion channel 160*a* disposed in the first diffusion area 142*a* (refer to FIG. 5).

As illustrated in FIG. 5, the first diffusion channel 160*a* may include an upper area A1 adjacent to the first inlet manifold 121 and a lower area A2 adjacent to the second outlet manifold 132. The resistance part 180 of this embodiment may include an upper portion disposed in the upper area A1 and a lower portion disposed in the lower area A2.

In the reaction area 141, water is produced by a fuel cell reaction. The lower area A2 is an area disposed adjacent to the second outlet manifold 132 through which the reactant gas is released. Accordingly, moisture exchange may more actively occur in the lower area A2 than in the upper area A1. Due to this, the need for moisture stagnation is greater in the upper area A1 than in the lower area A2. In view of that, the upper portion of the resistance part 180 may be formed to be more hydrophilic than the lower portion of the resistance part 180. The higher the hydrophilic property, the higher the degree to which moisture remains. Furthermore, in the lower area A2, release of moisture may be more important than stagnation of moisture. This is because water introduced from the first inlet manifold 121 is easily gathered in the lower area A2. This phenomenon may be induced by the following two causes. First, the water is heavier than the reactant gas. Second, the flow speed of the reactant gas is lowered when the reactant gas flows into the diffusion channel from the manifold. Accordingly, the water flowing into the diffusion channel from the manifold together with the reactant gas is easily gathered in the lower area A2.

Meanwhile, a diffusion-area porous body 181 may be formed to be more hydrophilic than the reaction-area porous body 190. Accordingly, the degree to which moisture remains in the diffusion area 142 may be further raised. For reference, methods for raising the hydrophilic or hydrophobic property of a target by specifically treating the surface of the target have been known. For example, methods such as plasma treatment, chemical treatment, coating treatment, and the like have been known. The hydrophilic property of the diffusion-area porous body 181 may be raised by these treatments.

The first diffusion channel 160*a* in the first diffusion area 142*a* of the main body 110 may be filled with the resistance part 180 of this embodiment without a change in the structure of the main body 110. Accordingly, the resistance part 180 of this embodiment may be applied to a main body in the related art without change to solve a problem of deterioration in moisture content.

The first diffusion channel 160*a* is provided between the lands 161 (refer to FIG. 4). The lands 161 serve as conductors. Accordingly, the resistance part 180 with which the first diffusion channel 160*a* is filled may be selected in consideration of only a flow resistance increase without considering conductivity.

Embodiment 2

A separator according to embodiment 2 of the present disclosure includes a main body 110 and a resistance part 280. The separator of embodiment 2 differs from the separator of embodiment 1 in terms of the resistance part. The following description will be focused on the resistance part 280.

The resistance part 280 of this embodiment is configured to allow moisture in a reactant gas introduced from the inlet manifold 120 and flowing toward the outlet manifold 130 to stagnate. When the moisture in the reactant gas further stagnates due to the resistance part 280, the moisture in the reactant gas may further remain in the area where the resistance part 280 is disposed.

In this embodiment, part of a reaction-area porous body 290 (refer to FIG. 6) may serve as the resistance part 280. Likewise to the reaction-area porous body 190 of embodiment 1 described above, the reaction-area porous body 290 of FIG. 6 may be disposed in the reaction area 141 (refer to FIG. 1) and may form a reactant gas guide channel for guiding the reactant gas to the electrodes of the MEA 111. The reaction-area porous body 290 of this embodiment may be substantially the same as the reaction-area porous body 190 of embodiment 1 in terms of the basic structure.

Figure 6:
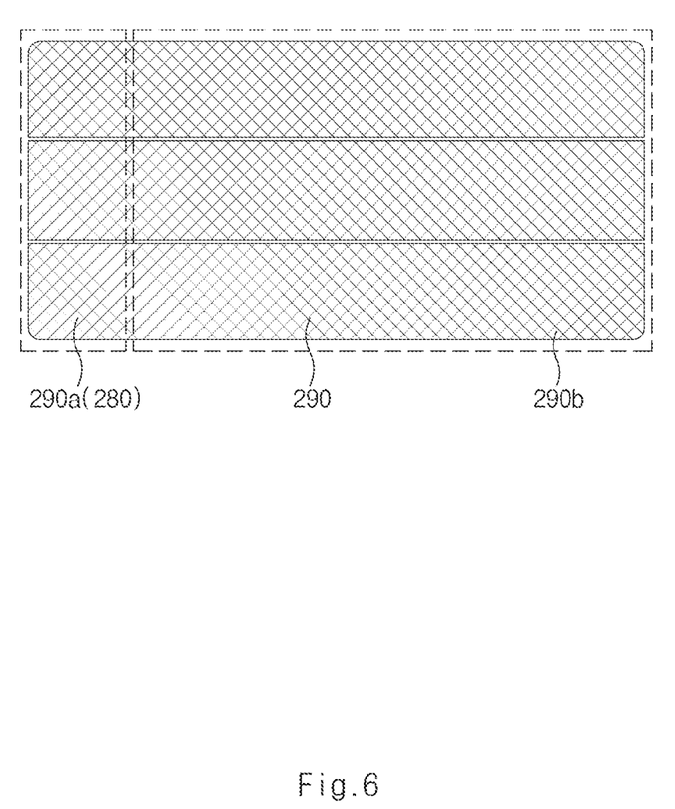
FIG. 6 is a plan view illustrating a porous structure, where the porous structure is able to be disposed in the reaction area of the separator of FIG. 1 and part of the porous structure functions as a resistance body.

The reaction-area porous body 290 may include an upstream portion 290*a* that is disposed adjacent to the inlet manifold 120 and into which the reactant gas flows, and a downstream portion 290*b* disposed downstream of the upstream portion 290*a*. The upstream portion 290*a* may be formed to be more hydrophilic than the downstream portion 290*b*. The moisture in the reactant gas may easily stagnate when the hydrophilic property is raised.

The separator of this embodiment may raise the hydrophilic property of the upstream portion 290*a* of the reaction-area porous body 290, thereby raising a moisture content of an electrolyte membrane disposed to correspond to the upstream portion 290*a*. The upstream portion 290*a* of the reaction-area porous body 290 may be the resistance part 280 for allowing the moisture in the reactant gas to stagnate.

Even in the related art, there is an example in which a porous body is used in the reaction area 141. However, in the related art, the porous body is configured such that the same characteristic appears in the entire reaction area 141. In contrast, the reaction-area porous body 290 of this embodiment is configured such that the characteristics of the upstream portion 290*a* and the downstream portion 290*b* differ from each other. Accordingly, the moisture content of the electrolyte membrane in the upstream portion 290*a* where a problem of degradation in the electrolyte membrane is likely to occur may be raised.

The upstream portion 290*a* of the reaction-area porous body 290 may be appropriately selected in consideration of an area where degradation in the electrolyte membrane is likely to occur.

To raise the hydrophilic property of the upstream portion 290*a*, a contact angle of the upstream portion 290*a* may be formed to be smaller than a contact angle of the downstream portion 290*b*. The contact angle may be used to represent the degree of hydrophilicity or hydrophobicity. The smaller the contact angle, the higher the degree of hydrophilicity. This is an ordinary matter, and therefore detailed description thereabout is omitted.

According to embodiments of the present disclosure, the resistance part may be disposed in a partial area of an existing separator to increase flow resistance in the area where the resistance part is disposed, thereby enabling moisture in a reactant gas to further remain in the area where the resistance part is disposed and enabling the remaining moisture to be left for a longer period of time in the area where the resistance part is disposed, which in turn raises moisture content of an electrolyte membrane in the area where the resistance part is disposed and an area downstream thereof.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A separator for a fuel cell, the separator comprising:
   a main body having an inlet manifold for inflow of a reactant gas, an outlet manifold for outflow of the reactant gas, and a flow area between the inlet manifold and the outlet manifold where the reactant gas is configured to flow; and
   a resistance part provided in the flow area of the main body adjacent to the inlet manifold of the main body, the resistance part being configured to increase flow resistance to the reactant gas introduced from the inlet manifold and flowing toward the outlet manifold;
   wherein the flow area includes:
      a reaction area having a reactant gas guide channel disposed therein, wherein the reactant gas guide channel is configured to guide the reactant gas to electrodes of a membrane electrode assembly; and
      a diffusion area located between the reaction area and the inlet manifold and having a plurality of diffusion channels disposed therein, wherein;

the plurality of diffusion channels are configured to allow the reactant gas to flow in different flow passages in order to diffuse the reactant gas introduced from the inlet manifold toward the reaction area,
the plurality of diffusion channels are formed between lands of the diffusion area,
the resistance part is filled in the plurality of diffusion channels in the diffusion area in order to increase the flow resistance to the reactant gas passing through the plurality of diffusion channels, and
the different flow passages each form a separate oblique path between the reaction area and the inlet manifold.

2. The separator of claim 1, wherein the resistance part includes a diffusion-area porous body configured to lower flow speed of the reactant gas passing through the diffusion channels.

3. The separator of claim 2, wherein the diffusion-area porous body is formed to be more hydrophilic than a reaction-area porous body disposed in the reaction area and configured to form the reactant gas guide channel.

4. The separator of claim 2, wherein the diffusion-area porous body is integrated with a reaction-area porous body disposed in the reaction area and configured to form the reactant gas guide channel.

5. The separator of claim 1, wherein:
the inlet manifold includes a first inlet manifold for inflow of air and a second inlet manifold for inflow of hydrogen;
the outlet manifold includes a first outlet manifold for outflow of the air and a second outlet manifold for outflow of the hydrogen;
the first and second inlet manifolds and the first and second outlet manifolds are disposed such that the air and the hydrogen flow in opposite directions and an imaginary line drawn from the first inlet manifold to the first outlet manifold crosses an imaginary line drawn from the second inlet manifold to the second outlet manifold;
the flow area includes:
a first reaction area having a first reactant gas guide channel disposed therein, wherein the first reactant gas guide channel is configured to guide the air to a cathode of the membrane electrode assembly; and
a first diffusion area located between the first reaction area and the first inlet manifold and having first diffusion channels disposed therein, wherein the first diffusion channels are configured to diffuse the air introduced from the first inlet manifold toward the first reaction area; and
the resistance part is disposed in the first diffusion channel in the first diffusion area.

6. The separator of claim 5, wherein the resistance part includes:
an upper portion disposed in an area of the first diffusion channels that are adjacent to the first inlet manifold; and
a lower portion disposed in an area of the first diffusion channels that are adjacent to the second outlet manifold,
wherein the upper portion of the resistance part is formed to be more hydrophilic than the lower portion of the resistance part.

7. The separator of claim 1, wherein:
the inlet manifold is configured to introduce air as the reactant gas; and
the outlet manifold is configured to release the air.

8. A separator for a fuel cell, the separator comprising:
a main body having an inlet manifold configured for inflow of a reactant gas, an outlet manifold configured for outflow of the reactant gas, and a flow area between the inlet manifold and the outlet manifold where the reactant gas is configured to flow; and
a resistance part provided in the flow area of the main body adjacent to the inlet manifold of the main body, the resistance part being configured to allow moisture in the reactant gas introduced from the inlet manifold and flowing toward the outlet manifold to stagnate;
wherein the flow area includes:
a reaction area in which a reaction-area porous body configured to form a reactant gas guide channel configured to guide the reactant gas to electrodes of a membrane electrode assembly is disposed, and
a diffusion area located between the reaction area and the inlet manifold,
wherein the reaction-area porous body includes an upstream portion that is disposed adjacent to the inlet manifold and into which the reactant gas is configured to flow, and a downstream portion disposed downstream of the upstream portion based on a flow direction of the reactant gas to be flowing from the inlet manifold to the outlet manifold; and
wherein the upstream portion of the reaction-area porous body is formed to be more hydrophilic than the downstream portion of the reaction-area porous body such that the moisture in the reactant gas stagnates more in the upstream portion of the reaction-area porous body than in the downstream portion of the reaction-area porous body.

9. A separator for a fuel cell, the separator comprising:
an inlet manifold for inflow of a reactant gas;
an outlet manifold for outflow of the reactant gas;
a flow area between the inlet manifold and the outlet manifold, the flow area configured to allow the reactant gas to flow from the inlet manifold to the outlet manifold, the flow area including:
a reaction area;
a reactant gas guide channel disposed in the reaction area;
a diffusion area located between the reaction area and the inlet manifold; and
a plurality of diffusion channels disposed in the diffusion area, the plurality of diffusion channels being formed between lands of the diffusion area, and being configured to allow the reactant gas to flow in different flow passages in order to diffuse the reactant gas introduced from the inlet manifold toward the reaction area, wherein the different flow passages each form a separate oblique path between the reaction area and the inlet manifold; and
a resistance part provided in the flow area adjacent to the inlet manifold, wherein the resistance part is filled in the plurality of diffusion channels in the diffusion area in order to increase flow resistance to the reactant gas passing through the plurality of diffusion channels.

10. The separator of claim 9, wherein the reactant gas guide channel is configured to guide the reactant gas to electrodes of a membrane electrode assembly.

11. The separator of claim 10, wherein the resistance part includes a diffusion-area porous body, and wherein the diffusion-area porous body is configured to lower flow speed of the reactant gas passing through the diffusion channels.

12. The separator of claim 11, further comprising a reaction-area porous body disposed in the reaction area and configured to form the reactant gas guide channel.

13. The separator of claim 12, wherein the diffusion-area porous body is formed to be more hydrophilic than the reaction-area porous body.

14. The separator of claim 12, wherein the diffusion-area porous body is integrated with the reaction-area porous body.

15. The separator of claim 9, wherein:
the inlet manifold includes a first inlet manifold for inflow of air and a second inlet manifold for inflow of hydrogen;
the outlet manifold includes a first outlet manifold for outflow of the air and a second outlet manifold for outflow of the hydrogen; and
the first and second inlet manifolds and the first and second outlet manifolds are disposed such that the air and the hydrogen flow in opposite directions and an imaginary line drawn from the first inlet manifold to the first outlet manifold crosses an imaginary line drawn from the second inlet manifold to the second outlet manifold.

16. The separator of claim 15, wherein the flow area includes:
a first reaction area;
a first reactant gas guide channel disposed in the first reaction area, the first reactant gas guide channel being configured to guide the air to a cathode of a membrane electrode assembly;
a first diffusion area located between the first reaction area and the first inlet manifold; and
first diffusion channels disposed in the first diffusion area, the first diffusion channels being configured to diffuse the air introduced from the first inlet manifold toward the first reaction area.

17. The separator of claim 16, wherein the resistance part is disposed in the first diffusion channels in the first diffusion area.

18. The separator of claim 17, wherein the resistance part includes:
an upper portion disposed in an area of the first diffusion channels that are adjacent to the first inlet manifold; and
a lower portion disposed in an area of the first diffusion channels that are adjacent to the second outlet manifold,
wherein the upper portion of the resistance part is formed to be more hydrophilic than the lower portion of the resistance part.

19. The separator of claim 1, wherein the resistance part is configured to lower a flow speed of reactant gas by increasing the flow resistance of the reactant gas flowing along the diffusion channels through the resistance part.

20. The separator of claim 19, wherein the resistance part is configured to increase a degree to which moisture remains in the reactant gas.

* * * * *